US008307814B2

(12) United States Patent
Leroy et al.

(10) Patent No.: US 8,307,814 B2
(45) Date of Patent: Nov. 13, 2012

(54) METHOD OF CONTROLLING IN-CYLINDER TRAPPED GAS MASSES IN A VARIABLE TIMING GASOLINE ENGINE

(75) Inventors: Thomas Leroy, Paris (FR); Jonathan Chauvin, Neuilly-sur-Seine (FR)

(73) Assignee: IFP, Cedex (FR)

( * ) Notice: Subject to any disclaimer, the term of this patent is extended or adjusted under 35 U.S.C. 154(b) by 369 days.

(21) Appl. No.: 12/686,411

(22) Filed: Jan. 13, 2010

(65) Prior Publication Data
US 2010/0180876 A1  Jul. 22, 2010

(30) Foreign Application Priority Data
Jan. 21, 2009  (FR) ...................................... 09 00264

(51) Int. Cl.
F02B 47/08 (2006.01)
F01L 1/34 (2006.01)
(52) U.S. Cl. ............................... 123/568.14; 123/90.15
(58) Field of Classification Search ............... 123/90.15, 123/90.16, 568.14
See application file for complete search history.

(56) References Cited

U.S. PATENT DOCUMENTS

| 6,742,494 B2* | 6/2004 | Unger et al. ................... 123/305 |
| 6,827,051 B2* | 12/2004 | Kawasaki et al. ........... 123/90.15 |
| 6,915,776 B2* | 7/2005 | zur Loye et al. ............... 123/304 |
| 7,143,753 B2* | 12/2006 | Tanaka et al. ............. 123/568.14 |
| 7,174,880 B2* | 2/2007 | Henn et al. ..................... 123/436 |
| 7,292,928 B2* | 11/2007 | Vick et al. ...................... 701/103 |
| 7,360,523 B2* | 4/2008 | Sloane et al. .................. 123/305 |
| 7,540,270 B2* | 6/2009 | Kang et al. ..................... 123/295 |
| 7,689,345 B2* | 3/2010 | Wiggins et al. ............... 701/103 |
| 7,801,665 B2* | 9/2010 | Buckland et al. ............. 701/103 |
| 7,987,040 B2* | 7/2011 | Buckland et al. ............. 701/103 |
| 8,001,951 B2* | 8/2011 | Ellmer et al. .................. 123/435 |
| 2001/0011541 A1 | 8/2001 | Kawasaki et al. |
| 2003/0154965 A1* | 8/2003 | Koch ........................ 123/568.14 |

(Continued)

FOREIGN PATENT DOCUMENTS
EP  1 104 844 A2  6/2001
(Continued)

OTHER PUBLICATIONS

A. Stefanopoulou et al: "Dynamic Scheduling of Internal Exhaust Gas Recirculation Systems," in Proc. IMECE, vol. 61, 1997, pp. 671-678.

(Continued)

Primary Examiner — Thomas Moulis
(74) Attorney, Agent, or Firm — Antonelli, Terry, Stout & Kraus, LLP.

(57) ABSTRACT

The invention is a method of controlling trapped gas masses in cylinders of a variable timing gasoline engine. A set point is determined for a trapped air mass in a cylinder and a set point is determined for trapped burnt gas mass in a cylinder. Then, in order to meet these set points: an intake pressure set point is generated from measurements of variable timing of positions of actuators and from the air mass set point; a position set point is generated for each of two variable timing actuators, from an intake pressure measurement and from the burnt gas mass set point; finally, a throttle and the variable timing actuators are controlled so as to meet the intake pressure set point and the set point position of the variable timing actuators.

4 Claims, 2 Drawing Sheets

U.S. PATENT DOCUMENTS

| | | |
|---|---|---|
| 2005/0034706 A1 | 2/2005 | Nogi et al. |
| 2005/0205055 A1 | 9/2005 | Shimizu |
| 2006/0042591 A1 | 3/2006 | Henn et al. |
| 2010/0228466 A1* | 9/2010 | Ekchian et al. ............... 701/113 |
| 2011/0168130 A1* | 7/2011 | Kang et al. .................... 123/295 |

FOREIGN PATENT DOCUMENTS

WO     WO 2004/016925 A1     2/2004

OTHER PUBLICATIONS

M. Jankovic et al: "Torque Management of Engines With Variable Cam Timing," in Control Systems Magazine, IEEE, vol. 18, 1998, pp. 34-42.

M. Jankovic et al: "Nonlinear Control in Automotive Engine Applications," in Proc. of 15$^{th}$ International Symposium on Mathematical Theory of Networks and Systems, 2002, pp. 1-9.

T. Leroy et al: "Modeling Fresh Air Charge and Residual Gas Fraction on a Dual Independent Variable Valve Timing SI Engine," in Proc. of SAE Conference, 2008-01-0983, 2008), pp. 627-635.

T. Leroy et al: "Airpath Control of a SI Engine with Variable Valve Timing Actuators," in Proc. of ACC, 2008, pp. 2076-2083.

Jonathan Chauvin et al: "Experimental Control of Variable Cam Timing Actuators," in Proc. Of IFAC Automotive Control, 2007, 7 pgs.

* cited by examiner

METHOD OF CONTROLLING IN-CYLINDER TRAPPED GAS MASSES IN A VARIABLE TIMING GASOLINE ENGINE

BACKGROUND OF THE INVENTION

Field of the Invention

The present invention relates to engine control and more particularly to the control of trapped gas masses in cylinders of a variable timing gasoline engine.

The constraints linked with the consumption and emission from gasoline engines have led to significant changes in such engines. Downsizing appears to be the most promising solution. In fact, it allows shifting the working points of the engine to zones of higher yield (pumping loss reduction). Operation of such an engine then requires the presence of a turbocompressor to provide an output torque equivalent to an engine of conventional displacement. Coupled with a direct injection, this type of engine requires the presence of a variable timing so as to take full advantage of the full load potential. The term "variable timing" refers here to a technology allowing the timing of the intake and exhaust valves to be varied.

The goal of engine control is to guarantee the torque response to a driver's request (via the accelerator pedal) while minimizing pollutants and fuel consumption. In a gasoline engine, the three-way catalyst provides treatment of the pollutants (nitrogen oxides NOx, hydrocarbons HC and carbon monoxide CO). This catalyst operates in an optimal manner only within a narrow operating range, that is when the proportions of the air/fuel mixture allow providing complete combustion of the fuel without excess air. Stoichiometry is obtained for a fuel/air ratio of one. This combustion richness, denoted by r, is defined as the ratio between, on the one hand, the ratio of the fuel mass ($M_{fuel}$) to the air mass (MA for the real mixture and, on the other hand, the ratio of the fuel mass ($M_{fuel}$) to the air mass ($M_{air}$) for the stoichiometric mixture:

$$r = \frac{\left(\frac{M_{fuel}}{M_{air}}\right)_{real}}{\left(\frac{M_{fuel}}{M_{air}}\right)_{stoichiometric}} = \frac{\left(\frac{M_{fuel}}{M_{air}}\right)_{real}}{14.5}$$

A parameter called lambda, λ, corresponding to the inverse of the fuel/air ratio, is generally used. Thus: $\lambda = 14.5\, M_{fuel}/M_{air}$. The goal is to keep a fuel/air ratio of 1 (stoichiometry), the mass of fuel to be injected is therefore linked with the trapped mass of air by the relation $M_{fuel}=M_{air}/14.5$. It becomes obvious that the torque supplied only depends on one datum: the trapped air mass in a cylinder.

FIG. 1 is a diagram of a VVT (variable valve timing) type gasoline engine. This engine comprises a fresh air intake manifold (CA) wherein a throttle valve (PA) allows the amount of air entering into a cylinder (CY) to be adjusted. Means for measuring the pressure ($P_{alm}$) and the temperature ($T_{adm}$) are generally positioned between cylinder (CY) and throttle valve (PA). Cylinder (CY) comprises intake (SA) and exhaust (SE) valves. Each one of these valves is provided with a VVT actuator (ActVVT) allowing the valve lift timing to be controlled. The position of this actuator is denoted by $\Phi_{adm}$ for the intake valve and by $\Phi_{ech}$ for the exhaust valve. Finally, the engine comprises, at the cylinder outlet, an exhaust manifold (CE).

In a fixed-timing engine, the air filling is given by a static relation depending on the engine speed and the intake pressure. Controlling the air mass in the cylinder thus amounts to controlling the intake pressure via the throttle valve. In a VVT type engine, filling also depends on the opening and closing times of the intake and exhaust valves. FIG. 2 illustrates the phase shift (translation) of the valve lift curves (LS) as a function of crank angle α: the exhaust valve lift is denoted by LE, the lift of the intake valve is denoted by LA. The valve phase shift allows modifying the amount of burnt gas in the combustion chamber by allowing internal recirculation of the gases from the previous combustion. During a torque transient, the difference in dynamics between the intake pressure and the variable timing actuators (VVT actuator for example) can affect the air mass transient. This leads to a torque transient and drivability degradation.

There are various known control strategies for compensating for the effect of the variable timing actuators on the air mass under transient conditions. A dynamic control of the variable timing actuators based on the measurement of the throttle position and of the engine speed is described in:

A. Stefanopoulou and I. Kolmanovsky, "*Dynamic Scheduling of Internal Exhaust Gas Recirculation Systems,*" in Proc. IMECE, vol. 61, 1997, pp. 671-678.

However, such a strategy requires good knowledge of the variable timing actuator dynamics, which is not the case in reality (dynamics depending on the oil temperature and pressure).

Other techniques consider the variable timing actuators as a disturbance in the fresh air intake system. These methods generate a throttle position set point allowing obtaining a transient air response, similar to the response that can be obtained in a fixed-timing engine. Such methods are presented in:

M. Jankovic, F. Frischmuth, A. Stefanopoulou, and J. Cook, "*Torque Management of Engines with Variable Cam Timing,*" in Control Systems Magazine, IEEE, vol. 18, 1998, pp. 34-42.

or in:

M. Jankovic, "*Nonlinear Control in Automotive Engine Applications,*" in Proc. of 15th International Symposium on Mathematical Theory of Networks and Systems, 2002.

These methods take account of the various dynamics of the system using the measurement of the position of the variable timing actuators in the throttle control. However, in all these techniques, the variable timing actuators are strategically positioned to meet an optimum amount of burnt gas in the cylinder according to the working point.

SUMMARY OF THE INVENTION

The invention relates to an alternative method for controlling the air and burnt gas masses in the cylinder by accounting for the system dynamics. The method allows controlling the trapped air mass by generating an intake pressure set point, by accounting for the measurement of the position of the variable timing actuators. In parallel, the method allows controlling the burnt gas mass by generating a set point for the variable timing actuators, by accounting for the intake pressure measurement.

The invention relates to a method for controlling gas masses trapped in a cylinder of a variable timing gasoline engine. The cylinder comprises an intake valve and an exhaust valve which are each provided with a variable timing actuator. The cylinder is connected to an intake manifold provided with an intake throttle. According to the method, a trapped air mass set point in a cylinder and a trapped burnt gas mass set point in a cylinder are determined, and these gas mass set points are met by the following:

generating an intake pressure set point from measurements of positions of variable timing actuators and from an air mass set point;

generating a position set point for each of the variable timing actuators, from set points of an intake pressure and from the burnt gas mass; and controlling the intake throttle and the variable timing actuators to meet the intake pressure set point and the position set points of variable timing actuators.

According to the method, the position set points of the variable timing actuators can be generated:

by generating through mapping a position set point for a first actuator;

by generating a position set point for a second actuator by the position set point of the first actuator and a measurement of the intake pressure and a measurement of the burnt gas mass set point; and by modifying a position set point of the first actuator if the position set point of the second actuator corresponds to a limit position for the second actuator.

In order to determine the intake pressure set point and the position set points of the variable timing actuators, it is possible to use a static cylinder filling model comprising a first model f allowing estimation of an air mass in a cylinder as a function of an intake pressure and of positions of the variable timing actuators, and a second model g allowing estimation of a mass of burnt gas in a cylinder as a function of an intake pressure and of positions of the variable timing actuators positions, The model f is invertible with respect to the intake pressure, and the model g is invertible with respect to the positions of the variable timing actuators.

BRIEF DESCRIPTION OF THE DRAWINGS

Other features and advantages of the method according to the invention will be clear from reading the description hereafter of non limitative embodiment examples, with reference to the accompanying figures wherein.

DETAILED DESCRIPTION OF THE INVENTION

Figure 1:
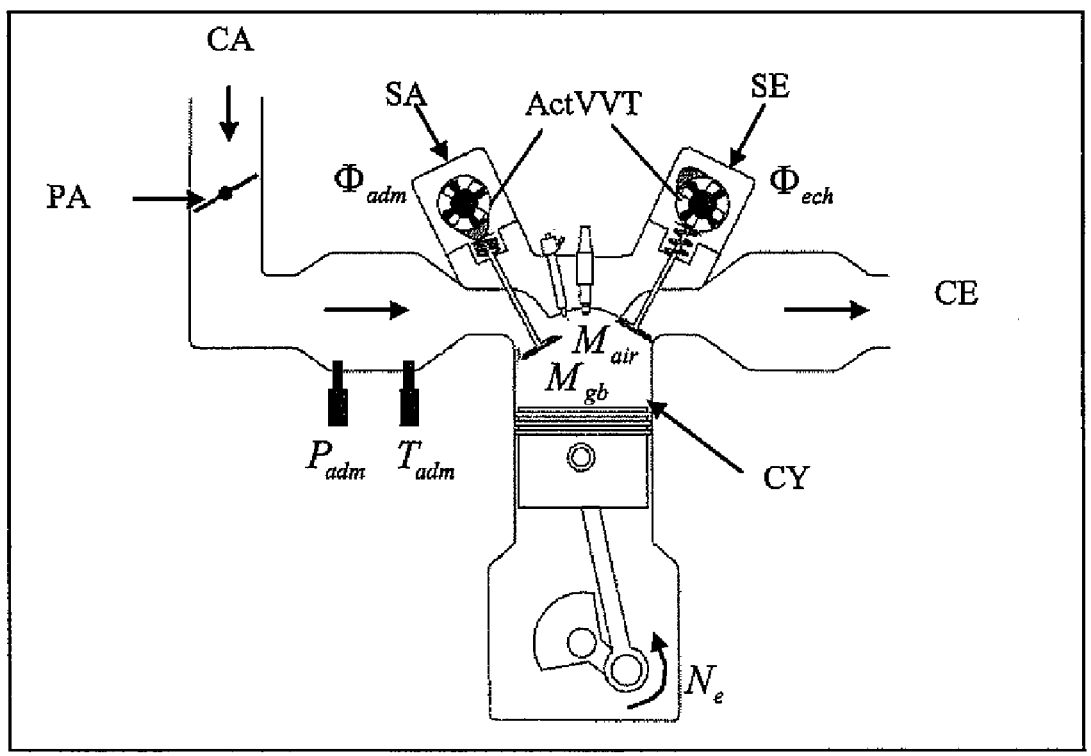
FIG. 1 is a diagram of a VVT type variable timing gasoline engine.
Figure 2:
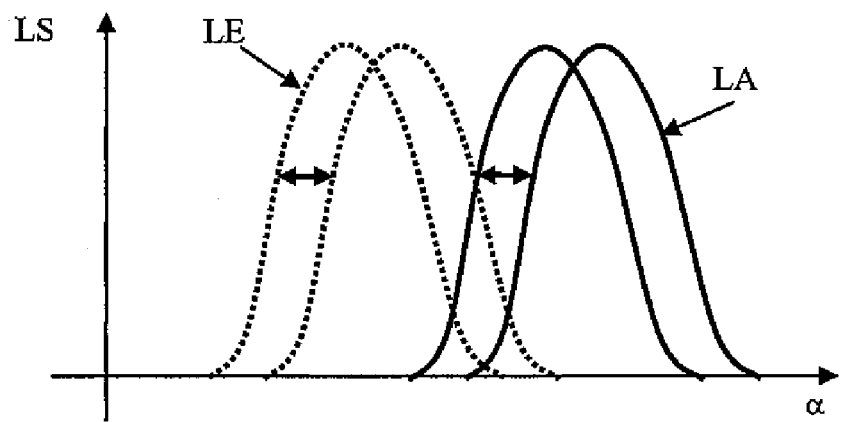
FIG. 2 illustrates the phase shift (translation) of valve lift curves (LS) as a function of crank angle $\alpha$.

The following notations are used in the description hereafter:

Measured Variables $N_e$: Engine speed. Conventionally, it is considered to be constant. (This hypothesis is justified by the fact that the engine speed variations are much slower than the variations of the other variables considered).

$P_{adm}$: Pressure in the intake manifold. It corresponds to a mean value between each TDC (top dead center). The pressure definition domain is denoted by $\Omega_P$.

$T_{adm}$: Temperature in the intake manifold. Conventionally, this variable is considered to be constant. In fact, an exchanger arranged upstream from the throttle allows the intake temperature to be regulated.

$\Phi_{adm}$: Position of the variable timing actuator of the intake valve. This position corresponds to a phase shift, in degree, in relation to a reference position. The actuator is saturated, its operating range is denoted by $\Omega_{adm}$.

$\Phi_{ech}$: Position of the variable timing actuator of the exhaust valve. This position corresponds to a phase shift, in degrees, in relation to a reference position. The actuator is saturated, its operating range is denoted by $\Omega_{adm}$.

Variables to be Controlled $M_{air}$: In-cylinder trapped air mass. It corresponds to the amount of air present in the cylinder upon closing of the intake valve. The air mass definition domain is denoted by $\Omega_{air}$.

$M_{gb}$: In-cylinder trapped burnt gas. It corresponds to the amount of burnt gas present in the cylinder upon closing of the intake valve. The burnt gas mass definition domain is denoted by $\Omega_{gb}$.

Set Points to be Achieved $\overline{M}_{air}$: In-cylinder trapped air mass set point. It is given by a mapping depending on the engine speed and the torque required by the driver.

$\overline{M}_{gb}$: In-cylinder trapped burnt gas mass set point. It is given by a mapping depending on the engine speed and the torque required by the driver. It corresponds to an optimum value from a consumption-pollution point of view.

Set points determined by the trapped mass controller $\overline{P}_{adm}$: Intake pressure set point. This quantity is determined by the trapped mass controller.

$\overline{\Phi}_{adm}$: Position set point for the variable timing actuator of the intake valve. This quantity is determined by the trapped mass controller.

$\overline{\Phi}_{ech}$: Position set point for the variable timing actuator of the exhaust valve. This quantity is determined by the trapped mass controller.

The goal of the method according to the invention is to control the gas mass trapped in a cylinder of a variable-timing gasoline engine. A set point for trapped air mass pointing cylinder(s) and a set point for trapped burnt gas mass in cylinder(s) are therefore first determined.

These two set points are obtained through mappings depending on the engine speed and the torque required by the driver. This mapping type is well known.

Filling of the cylinder with air and burnt gas depends in a quasi-static manner on the conditions outside the cylinder: Intake pressure and position of the variable timing actuators. Thus, in order to meet these gas mass set points, the following stages are carried out:

1—Generating an intake pressure set point from measurements of the positions of variable timing actuator and from the air mass set point;

2—Generating a position set point for each of the variable timing actuators, from an intake pressure measurement and from the burnt gas mass set point; and 3—Controlling a throttle and the variable timing actuators to meet the intake pressure set point and the position set points of the variable timing actuators.

1—Generating an Intake Pressure Set Point

The main control objective is the trapped air mass since it is directly linked with the torque and the fuel/air ratio. The control variable that has the strongest influence on filling, that is the intake pressure (since the variable timing actuators are saturated actuators), is thus used.

To generate an intake pressure set point, the fresh air mass set point and the measurements of the positions of the variable timing actuator are taken into account.

A static cylinder filling model can thus be used. This model comprises:

a first model, denoted by f, allowing estimation of the air mass in the cylinder as a function of the intake pressure and of the positions of the variable timing actuators; and a second model, denoted by g, allowing estimation of the burnt gas mass in the cylinder as a function of the intake pressure and of the positions of the variable timing actuators.

The model is then written as follows:

$$\begin{cases} M_{air} = f(P_{adm}, \Phi_{adm}, \Phi_{ech}) \\ M_{gb} = -g(P_{adm}, \Phi_{adm}, \Phi_{ech}) \end{cases}$$

Model f has to be invertible with respect to the intake pressure and model g has to be invertible with respect to the positions of the variable timing actuators. Thus, models f and g are functions that satisfy the following three partial inversion hypotheses:

For any $(\Phi_{adm}, \Phi_{ech}, M_{air}) \in \Omega_{adm} \times \Omega_{ech} \times \Omega_{air}$, there is a single $P_{adm} \in \Omega_P$ such that $f(P_{adm}, \Phi_{adm}, \Phi_{ech}) = M_{air}$.

For any $(P_{adm}, \Phi_{ech}, M_{gb}) \in \Omega_P \times \Omega_{ech} \times \Omega_{gb}$, there is a single $\Phi_{adm} \in \Re$ such that $g(P_{adm}, \Phi_{adm}, \Phi_{ech}) = M_{gb}$.

For any $(P_{adm}, \Phi_{adm}, M_{gb}) \in \Omega_P \times \Omega_{adm} \times \Omega_{gb}$, there is a single $\Phi_{ech} \in \Re$ such that $g(P_{adm}, \Phi_{adm}, \Phi_{ech}) = M_{gb}$.

The three partial inverse functions $f^{-1}_{\Phi_{adm}, \Phi_{ech}}$, $g^{-1}_{P_{adm}, \Phi_{ech}}$ and $g^{-1}_{P_{adm}, \Phi_{int}}$ are then defined to satisfy:

$$\begin{cases} M_{air} = f\left(P_{adm} = f^{-1}_{\Phi_{adm}, \Phi_{ech}}(M_{air}), \Phi_{adm}, \Phi_{ech}\right) & (1) \\ M_{bg} = g\left(P_{adm}, \Phi_{adm} = g^{-1}_{P_{adm}, \Phi_{ech}}(M_{gb}), \Phi_{ech}\right) \\ M_{bg} = g\left(P_{adm}, \Phi_{adm}, \Phi_{ech} = g^{-1}_{P_{adm}, \Phi_{adm}}(M_{gb})\right) \end{cases}$$

According to an embodiment, the static filling model defined in the following document, and referenced in the appendix, is used:

T. Leroy, J. Chauvin, F. Le Berr, A. Duparchy and G. Alix, "Modeling Fresh Air Charge and Residual Gas Fraction on a Dual Independent Variable Valve Timing SI Engine", in Proc. of SAE Conference, 2008-01-0983, 2008).

Inversion of the filling model allows calculation of the intake pressure set point that achieves the desired air mass, by accounting for the actual position of the variable timing actuators (VVT). The expression for the pressure set point is as follows:

$$\overline{P}_{adm} = f^{-1}_{\Phi_{adm}, \Phi_{ech}}(\overline{M}_{air}) \qquad (2)$$

When substituting (2) in (1), the equality $M_{air} = \overline{M}_{air}$ is still met, which means that meeting the intake pressure set point leads to meeting the fresh air mass set point.

2—Generating Variable Timing Actuator Position Set Points

A second control objective is the trapped burnt gas mass. The remaining two control variables are the positions of the variable timing actuators. The system is thus "over-actuated". To constrain the system, an actuator is fixed (for example the position of the intake valve variable timing actuator). The strategy works in the same way if it is the position of the exhaust valve variable timing actuator that is constrained. A position of the intake valve variable timing actuator satisfying pollutant and consumption minimization criteria is determined from an air mass/engine speed mapping. Let this mapping be denoted by $h: \Omega_{air} \to \Omega_{adm}$: $h(N_e, \overline{M}_{air})$. It is obtained from an optimization of the variable timing actuator position minimizing emissions and consumption under stabilized conditions. The position of the exhaust valve variable timing actuator then becomes the only degree for the burnt gas mass control. Its set point is calculated from the inversion of the burnt gas mass model (1). As before, it is the intake pressure measurement that is used in the inversion:

$$\overline{\Phi}_{ech} = g^{-1}_{P_{adm}, h(\overline{M}_{air})}(\overline{M}_{gb})$$

$$\overline{\Phi}_{adm} = h(\overline{M}_{air})$$

According to an embodiment, when the position set point of the exhaust valve variable timing actuator becomes unachievable (because of the actuator saturation—the valve reaches a limit position), the degree of freedom that had been eliminated, the position of the intake valve variable timing actuator, is used to meet the burnt gas mass requirement. The position set points for the variable timing actuators are then generated as follows:

Generating a position set point for a first actuator by means of mapping h;

Generating a position set point for the second actuator by the position set point of the first actuator, of an intake pressure measurement and of the burnt gas mass set point (that is from model g); and Modifying the position set point of the first actuator if the position set point of the second actuator corresponds to a limit position for the second actuator.

The expressions for the position set points are as follows:

$$\overline{\Phi}_{ech} = S^{at}_{ech}\left(g^{-1}_{P_{adm}, h(\overline{M}_{air})}(\overline{M}_{gb})\right) \qquad (3)$$

$$\overline{\Phi}_{adm} = \begin{cases} h(\overline{M}_{air}) & \text{if } \overline{\Phi}_{ech} \in \overset{\circ}{\Omega}_{ech} \\ S^{at}_{adm}\left(g^{-1}_{P_{adm}, \overline{\Phi}_{ech}}(\overline{M}_{gb})\right) & \text{otherwise} \end{cases}$$

where $\overset{\circ}{\Omega}_{ech}$ is the inside of $\Omega_{ech}$, $S^{at}_{adm}$ and $S^{at}_{ech}$ are the saturation functions of the variable timing actuators.

When substituting (3) in (1), the equality $M_{gb} = \overline{M}_{gb}$ is still met, provided that at least one position is not saturated, which means that meeting the position set points leads to meeting the burnt gas mass set point.

Once these set points are generated, the throttle and the variable timing actuators are controlled to meet the intake pressure set point and the variable timing actuator position set points.

Figure 3:
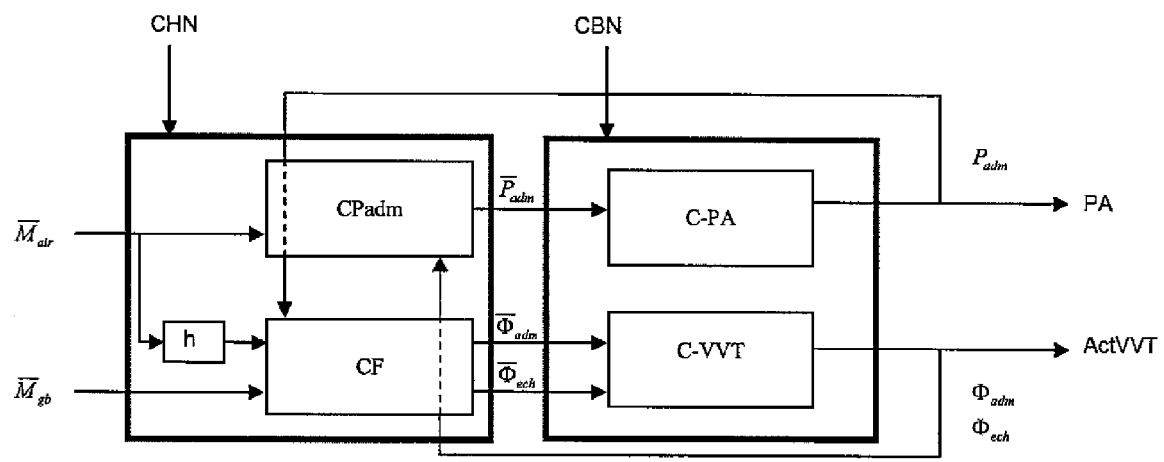
FIG. 3 illustrates the control strategy according to the invention.

To implement this method, the control strategy illustrated in FIG. 3 combines two types of controller:

1—The first controller type is referred to as low level controller CBN. It comprises two independent controllers: The function of one, C-PA, is to control the pressure in the intake manifold, and the function of the second, C-VVT, is to control the positions of the variable timing actuators of the intake and exhaust valves.

These low level controllers can be of any type. Control of the intake pressure is performed by controlling the throttle actuator (PA). Control can for example use the pressure detector located in the intake manifold. An example of a controller of this type is presented in T. Leroy, J. Chauvin and N. Petit, "*Airpath Control of a SI Engine with Variable Valve Timing Actuators*", in Proc. of ACC, 2008.

The position of the variable timing actuators can for example be controlled using a position measurement. An example of a controller of this type is presented in J. Chauvin and N. Petit, "*Experimental Control of Variable Cam Timing Actuators*", in Proc. of IFAC Automotive Control, 2007.

These two independent controllers do not have the same transient performances. At low load, the variable timing actuators (ActVVT) are slow in relation to the intake pressure, whereas at high load the pressure is much slower because of the turbocompressor inertia. The quantities to be controlled (air mass/burnt gas) are therefore inevitably degraded.

The control strategy provides coordination of these low level controllers by introducing a high level controller that determines the pressure and position set points to be achieved in order to meet the required trapped masses.

1—The second controller type is thus referred to as high level controller CHN. It comprises two independent controllers: the function of one, CPadm, is determining a pressure set point in the intake manifold and the function of the second, CF, is determining position set points for the valve variable timing actuators. These set points are determined as a function of an air mass set point and of a burnt gas mass set point.

In order to take into account the various response times of the low level controllers, the intake pressure measurements and actuator positions are used to generate their respective set point. This control strategy provides good transient behavior of the trapped masses. In fact, the slowness of a low level controller in relation to the other is taken into account by using low level variable measurements for generating high level set points.

This control strategy allows:

controlling the air mass and the burnt gas mass in the cylinder of a variable timing engine;

accounting for the measurement of the variables acting directly on filling (intake pressure and position of the variable timing actuators) so as to improve the air mass and burnt gas mass transient response;

improving the air mass transient response, which improves the fuel/air ratio regulation and drivability. For example, the slowness of the variable timing actuators (highly depending on oil pressure and temperature) is compensated by the change in the intake pressure set point so as to meet the required air mass;

controlling the burnt gas mass in the cylinder. For example, it is possible to degrade the set point for the gases burnt under cold start conditions to improve the combustion stability. The control presented positions then control the variable timing actuators to meet the desired amount of burnt gas;

controlling the in-cylinder trapped air mass while keeping a fixed amount of burnt gas in the cylinder;

controlling the trapped burnt gas mass in the cylinder while keeping a fixed amount of air in the cylinder; and using an a priori position of one of the variable timing actuators ($h(N_e, \overline{M}_{air})$ mapping) to remove a degree of freedom from the system and act as a supervisor. In the strategy presented, it is possible to use indifferently the variable timing actuator of the intake valve or of the exhaust valve.

APPENDIX

Filling Model

A static filling model is considered for estimating the air mass and the burnt gas mass in the cylinder as a function of the engine speed, temperature and intake pressure, and of the actuator positions (for example, T. Leroy, J. Chauvin, F. Le Berr, A. Duparchy and G. Alix, "*Modeling Fresh Air Charge and Residual Gas Fraction on a Dual Independent Variable Valve Timing SI Engine*", in Proc. of SAE Conference, 2008-01-0983, 2008).

Let air $M_{air}$ and burnt gas $M_{gb}$ masses be defined such that:

$$\begin{cases} M_{air} = \alpha_1 \dfrac{P_{adm}}{RT_{adm}} V_{ivc} - m_{gb} \\ M_{gb} = \alpha_2 \dfrac{OF}{N_e} + \alpha_3 V_{evc} \end{cases}$$

with:

$\alpha_1$, $\alpha_2$ and $\alpha_3$: Known mappings of $P_{adm}$ and $N_e$ (determined on the engine test bench);

$V_{ivc}$: Cylinder volume at ivc (intake valve closing), depending on the position of the intake valve actuator, $\phi_{adm}$;

$V_{evc}$: Cylinder volume at evc (exhaust valve closing), depending on the position of the exhaust valve actuator, $\phi_{ech}$;

OF: Overlap factor, depending on the positions of the intake and exhaust valve actuators, $\phi_{adm}$ and $\phi_{ech}$.

Overlap factor OF is determined by the relation:

$$OF = \int_{\theta_{ivo}}^{\theta_{iv}=\theta_{ev}} A_{int} d\theta + \int_{\theta_{iv}=\theta_{ev}}^{\theta_{evc}} A_{ech} d\theta$$

with:

$A_{adm}$ and $A_{ech}$: Opening areas of the intake and exhaust valves, $\theta$: Crank angle, $\theta_{ivo}$: Crank angle at ivo (intake valve opening), depending on the position of the intake valve actuator, $\phi_{adm}$, $\theta_{evc}$: Crank angle at evc (exhaust valve closing), depending on the position of the exhaust valve actuator, $\phi_{ech}$ $\theta_{iv}=\theta_{ev}$: Crank angle where the two valves have the same opening area.

Then functions $f: \Omega_P \times \Omega_{adm} \times \Omega_{ech} \to \Omega_{air}$ and $g: \Omega_P \times \Omega_{adm} \times \Omega_{ech} \to \Omega_{gb}$ are introduced which are defined as:

$$\begin{cases} f(P_{adm}, \Phi_{adm}, \Phi_{ech}) = \alpha_1(P_{adm}, N_e) \dfrac{P_{adm}}{RT_{adm}} V_{ivc}(\phi_{adm}) - \\ \quad \alpha_2(P_{adm}, N_e) \dfrac{OF(\phi_{adm}, \phi_{ech})}{N_e} - \alpha_3(P_{adm}, N_e) V_{evc}(\phi_{ech}) \\ g(P_{adm}, \Phi_{adm}, \Phi_{ech}) = \alpha_2(P_{adm}, N_e) \dfrac{OF(\phi_{adm}, \phi_{ech})}{N_e} + \\ \quad \alpha_3(P_{adm}, N_e) V_{evc}(\phi_{ech}) \end{cases}$$

For clarity reasons, the engine speed and the intake temperature are removed from the expression. Thus, the relationship:

$$\begin{cases} M_{air} = f(P_{adm}, \Phi_{adm}, \Phi_{ech}) \\ M_{gb} = g(P_{adm}, \Phi_{adm}, \Phi_{ech}) \end{cases}$$

The invention claimed is:

1. A method of controlling masses of gas trapped in a cylinder of a variable timing gasoline engine including an intake valve and an exhaust valve, each valve being provided with a variable timing actuator, the cylinder being connected to an intake manifold provided with an intake throttle, in which a trapped air mass set point in the cylinder and a trapped burnt gas mass set point in the cylinder are determined by mapping depending on engine speed and torque, comprising:

generating an intake pressure set point from measurements of positions of the variable timing actuators and from the trapped air mass set point;

generating position set points for the variable timing actuators from measurement of the intake pressure and from the trapped burnt gas mass set point; and controlling the intake throttle and the variable timing actuators to meet the intake pressure set point and the position set points of the variable timing actuators to provide control of the masses of gas trapped in the cylinder.

2. A method as claimed in claim 1, comprising:

generating the position set points of the variable timing actuators by mapping a position set point of a first actuator;

generating a position set point of a second actuator by utilizing the position set point of the first actuator, the measurement of the intake pressure and the trapped burnt gas mass set point; and modifying the position set point of the first actuator if a position set point of the second actuator corresponds to a limit position for the second actuator.

3. A method as claimed in claim 1, comprising:

determining the intake pressure set point and the position set points of the variable timing actuators with a static cylinder filling model comprising a first model providing estimation of an air mass in the cylinder as a function of the intake pressure and of positions of variable timing actuators, and a second model providing estimation of burnt gas mass in the cylinder as a function of the intake pressure and of positions of the variable timing actuators and wherein the first model is invertible with respect to the intake pressure and the second model is invertible with respect to the positions of the variable timing actuators.

4. A method as claimed in claim 2, comprising:

determining the intake pressure set point and the position set points of the variable timing actuators with a static cylinder filling model comprising a first model providing estimation of an air mass in the cylinder as a function of the intake pressure and of positions of variable timing actuators, and a second model providing estimation of burnt gas mass in the cylinder as a function of the intake pressure and of positions of the variable timing actuators and wherein the first model is invertible with respect to the intake pressure and the second model is invertible with respect to the positions of the variable timing actuators.

* * * * *